US006712924B2

(12) United States Patent
Silverbrook

(10) Patent No.: US 6,712,924 B2
(45) Date of Patent: Mar. 30, 2004

(54) GENERATING BOUND DOCUMENTS

(75) Inventor: Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 10/126,676

(22) Filed: Apr. 22, 2002

(65) Prior Publication Data

US 2002/0112663 A1 Aug. 22, 2002

Related U.S. Application Data

(63) Continuation of application No. 09/721,856, filed on Nov. 25, 2000, now Pat. No. 6,530,339.

(30) Foreign Application Priority Data

Feb. 20, 2000 (AU) ............................................ PR 1574

(51) Int. Cl.[7] ............................................... B32B 31/12

(52) U.S. Cl. ............................ 156/277; 156/310; 412/8

(58) Field of Search ................................ 156/277, 291, 156/384, 387, 556, 558, 559, 563, 566, 578, 310; 412/8, 37, 900, 901

(56) References Cited

U.S. PATENT DOCUMENTS

| | | | | | |
|---|---|---|---|---|---|
| 2,024,932 | A | * | 12/1935 | Kushera et al. | |
| 2,806,443 | A | * | 9/1957 | Horn et al. | |
| 3,404,880 | A | * | 10/1968 | Porter, Jr. et al. | |
| 3,793,016 | A | * | 2/1974 | Eichorn | |
| 4,179,325 | A | | 12/1979 | Staats et al. | |
| 4,342,613 | A | * | 8/1982 | O'Leary et al. | 156/310 |
| 4,343,673 | A | * | 8/1982 | Smith, Jr. et al. | |
| 4,406,247 | A | * | 9/1983 | Baughman et al. | |
| 4,537,650 | A | * | 8/1985 | Coons, Jr. | |
| 4,611,741 | A | * | 9/1986 | Wilson | |
| 4,707,215 | A | * | 11/1987 | Scarlata | |
| 5,137,593 | A | * | 8/1992 | Walter | |
| 5,167,739 | A | | 12/1992 | Hutchinson et al. | |
| 5,531,429 | A | * | 7/1996 | Clark | |
| 5,582,570 | A | * | 12/1996 | Crowley | |
| 5,601,389 | A | * | 2/1997 | Minami | |
| 5,735,659 | A | | 4/1998 | Kosasa et al. | |
| 5,863,372 | A | * | 1/1999 | Fabel | 156/277 |
| 6,041,205 | A | * | 3/2000 | Funada et al. | |
| 6,173,992 | B1 | | 1/2001 | Manico et al. | |
| 6,273,661 | B1 | | 8/2001 | Payne | |
| 6,394,728 | B1 | * | 5/2002 | Boss | |
| 6,485,606 | B2 | * | 11/2002 | Boss | |
| 6,530,339 | B1 | * | 3/2003 | Silverbrook | 118/46 |
| 2002/0157780 | A1 | * | 10/2002 | Onusseit | 156/273.7 |
| 2002/0159862 | A1 | * | 10/2002 | Ertel et al. | 412/8 |
| 2003/0062132 | A1 | * | 4/2003 | Silverbrook | 156/384 |
| 2003/0082029 | A1 | * | 5/2003 | Silverbrook | 412/8 |

FOREIGN PATENT DOCUMENTS

| | | | |
|---|---|---|---|
| DE | 2 131 256 | * | 1/1973 |
| EP | 0 019 125 | * | 11/1980 |
| EP | 0 568 803 | * | 11/1993 |
| EP | 677472 | | 10/1995 |
| GB | 2303580 | | 2/1997 |
| JP | 1-271368 | * | 10/1989 |
| JP | 11034536 | | 2/1999 |
| WO | WO 83/04215 | | 12/1983 |

OTHER PUBLICATIONS

"Document Binding System," IBM Technical Disclosure Bulletin, Dec. 1983, vol. 26, Issue 7A, pp. 3529–3531.*

* cited by examiner

*Primary Examiner*—Curtis Mayes

(57) ABSTRACT

A method of generating bound documents includes the step of conveying sheets of a print medium through a printing station. A printing process is carried out on the sheets in the printing station. The sheets are conveyed through an adhesive application station. Adhesive is applied to each sheet proximate an edge of each sheet in the adhesive application station. A predetermined number of the sheets are stacked together at a stacking station, so that respective strips of adhesive are aligned with each other. A binding operation is performed on said predetermined number of sheets so that said predetermined number of sheets are bound together to define a document.

9 Claims, 9 Drawing Sheets

GENERATING BOUND DOCUMENTS

This is a Continuation application of U.S. Ser. No. 09/721,856 filed on Nov. 25, 2000 now U.S. Pat. No. 6,530,339.

RELATED APPLICATIONS

This application is a continuation application of U.S. application Ser. No. 09/721,856

FIELD OF THE INVENTION

The following invention relates to a method of generating bound documents.

BACKGROUND OF THE INVENTION

It is well known to print individual sheets of a volume to be bound, place all of the printed sheets into a stack, crop one or more edges of the stack and to bind the sheets together by applying a binding adhesive to an edge of the stack of sheets. This is a time consuming and labour-intensive process.

It would be more efficient to provide pre-cut, uniformly sized sheets, print one or both surfaces of each sheet and provide a strip of binding adhesive to one or both surfaces of each sheet adjacent the edge to be bound. Then the printed and pre-glued sheets can be placed accurately in a stack, and the sheets adjacent the spine pressed so that the adhesive binds the sheet edges together.

It would also be desirable to provide an apparatus and method for applying a strip or strips of binding adhesive to a sheet as the sheet passes through a printer.

SUMMARY OF THE INVENTION

According to the invention, there is provided a method of generating bound documents, the method comprising the steps of:

- conveying sheets of a print medium through a printing station;
- carrying out a printing process on the sheets in the printing station;
- conveying the sheets through an adhesive application station;
- applying adhesive to each sheet proximate an edge of each sheet in the adhesive application station;
- stacking a predetermined number of the sheets at a stacking station, so that respective strips of adhesive are aligned with each other; and
- performing a binding operation on said predetermined number of sheets so that said predetermined number of sheets are bound together to define a document.

The step of carrying out a printing process on the sheets may comprise ejecting ink from an ink jet printhead on to the sheets.

The step of applying adhesive to the sheets may comprise the step of applying at least one adhesive strip to an edge of each sheet to be bound, while the sheet moves through the adhesive application station.

The adhesive strip may be applied to each sheet by ejecting the adhesive from an adhesive applicator positioned at the adhesive application station without the adhesive applicator making contact with the sheet.

The adhesive may be sprayed on to each sheet. In particular, the adhesive may be sprayed on to both sides of the sheet to apply the adhesive strip to each side of the sheet.

Instead of spraying the adhesive, the method may include the step of bringing at least one adhesive applicator into contact with the sheet while the sheet passes through the adhesive application station.

In one embodiment, the method may include the step of bringing a pair of opposed adhesive applicators into contact with the sheet so that the adhesive strip is applied to each side of the sheet. In particular, the method may include the step of bringing a pair of opposed adhesive applicator rollers into contact with the sheet so that the adhesive strip is applied to each side of the sheet.

The, or each, adhesive strip may be applied to a trailing edge of each sheet. Instead, the, or each, adhesive strip may be applied to a leading edge of each sheet.

The step of stacking the sheets may include feeding the sheets into a stacking tray of the stacking station, so that the sheets bear against a part of the stacking station, with the adhesive strips of the sheets aligned with respect to each other.

The step of performing the binding operation may include the step of applying pressure to the stacked sheets at a position aligned with the adhesive strips of the stacked sheets so that the adhesive strips serve to bind the stacked sheets together.

The invention is now described, by way of example, with reference to the accompanying drawings.

DESCRIPTION OF THE PREFERRED EMBODIMENTS

Figure 1:
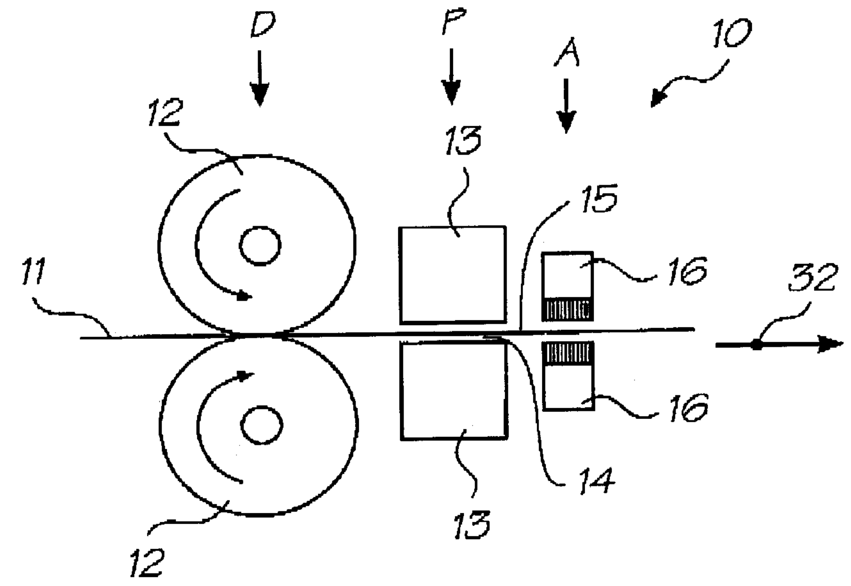
FIG. 1 is a schematic illustration showing an adhesive being applied to a sheet of print medium, in accordance with a method of the invention.

In FIG. 1, reference numeral 10 generally indicates a process, in accordance with the invention, by which adhesive is applied to a sheet 11 as the sheet 11 passes through a printer incorporating an adhesive applicator.

A driving station D drives the sheet 11 in the direction of an arrow 32. The driving station D comprises a pair of opposed pinch rollers 12. The sheet 11 is driven through a printing station P and then an adhesive application station A. Alternatively, the adhesive application station A precedes the printing station P. However, it is preferred that the adhesive application station A follow the printing station P so that adhesive on the sheet 11 does not clog a print head or print heads of the printing station P.

For single sided sheet printing, the printing station P comprises a single print head 13. The print head 13 is a pagewidth drop-on-demand ink jet print head. Alternatively, the print head 13 is that of a laser printer or other printing device. If the sheet 11 is to be printed on both sides, a pair of opposed print heads 13 are provided.

It will be appreciated that in an embodiment where the print heads 13 are ink jet print heads, wet ink 15 on the sheet 11 could pass through the adhesive application station A. This could result in smudging and distortion of the print on the sheet 11.

Thus, the printer incorporates an air cushion application means that is configured to be positioned on either side of the sheet 11 as it passes through the printing station P. The print head 13 defines an airflow path or gap 14 through which air can pass to generate the air cushion. It will be appreciated that the air serves to dry the ink.

The adhesive application station A can comprise an adhesive applicator 16 at one or both sides of the sheet 11, depending upon which side or sides of the sheet to which adhesive is to be applied.

Figure 2:
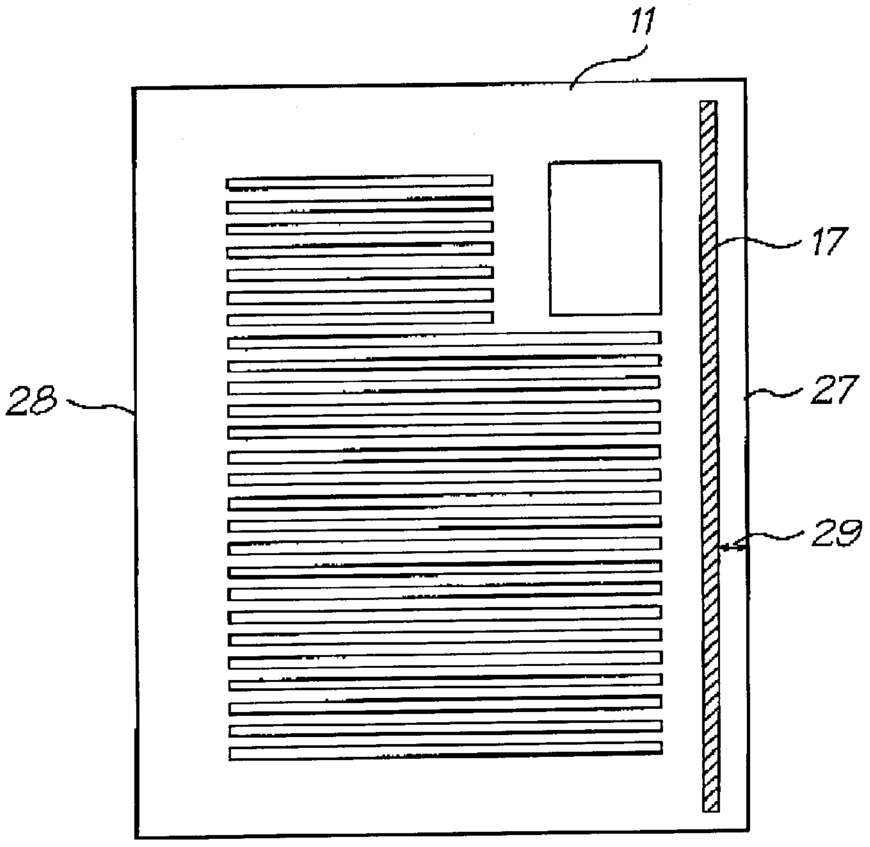
FIG. 2 is a schematic illustration of a sheet with an adhesive strip positioned adjacent one edge of the sheet, as a result of the working of a method in accordance with the invention.

As shown in FIG. 2, the sheet 11 having matter printed thereon by printing station P also includes a strip 17 of adhesive applied at the adhesive application station A.

The strip 17 is positioned adjacent to a leading edge 27 of sheet 11. The application of strip 17 adjacent to the leading edge 27 is suitable for those situations where the adhesive applicator does not touch the sheet 11, or touches the sheet 11 at a velocity accurately matching that of the sheet 11 as it passes the adhesive application station A. Alternatively, the strip 17 is applied adjacent to a trailing edge 28 of the sheet 11. This is more suited to adhesive applicators that make physical contact, such as brushing, with the sheet 11 as it passes the adhesive application station A.

A margin 29 between the strip 17 and edge 27 or 28 of sheet 11 is 1 to 2.5 mm wide.

Figure 3:
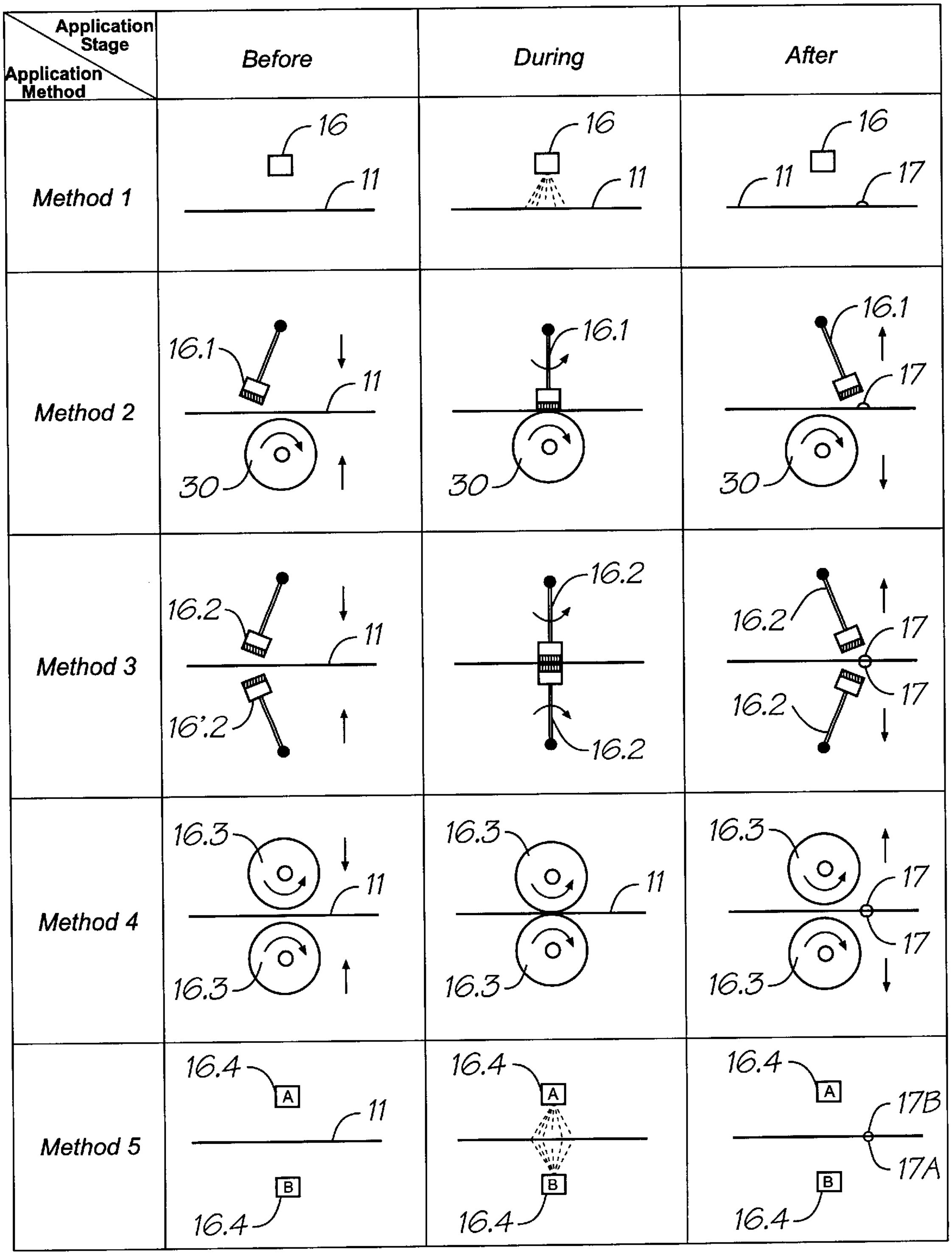
FIG. 3 is a table schematically illustrating the principles of five alternative embodiments of the method of the invention.

Various methods of applying adhesive to the sheet 11 are envisaged, some of which are schematically depicted in FIG. 3.

Method 1 in FIG. 3 is a non-contact method of applying adhesive to the moving sheet 11. In this method, a stationary adhesive applicator 16 sprays adhesive on to one side of the sheet 11 as it passes the adhesive applicator 16. The adhesive applicator 16 is formed integrally with the print head 13. Instead, the adhesive applicator is located upstream or downstream with respect to the print head 13.

Method 2 also applies adhesive to one side of the moving sheet 11. However, in this method, an adhesive applicator 16.1 touches the sheet 11 while applying the adhesive. The adhesive applicator 16.1 is pivotally mounted about a fixed pivot point and is pivoted so that a tangential speed of the applicator matches a speed at which the sheet 11 passes through the adhesive application station A. A reaction roller 30 bears against an underside of the sheet 11 as the adhesive applicator 16.1 applies adhesive to the sheet 11.

Method 3 applies adhesive to both sides of the sheet 11 as it passes through the adhesive application station A. A pair of opposed, pivotally mounted adhesive applicators 16.2 are pivoted so that a tangential speed of the applicators matches a speed at which the sheet 11 passes through the adhesive application station A. Thus, the applicators 16.2 both touch the sheet 11 simultaneously and mutually counteract each other's force component normal to the sheet 11.

Method 4 employs a pair of adhesive applicator rollers 16.3 spaced from either side of the sheet 11 until activated to apply adhesive. At that point, the rollers 16.3 move toward and touch the sheet 11, leaving the strip of adhesive 17 at either side of the sheet 11. The rollers 16.3 mutually counteract each other's force component normal to sheet 11.

Method 5 employs a pair of adhesive spray applicators 16.4 positioned on each side of the sheet 11. The applicators 16.4 do not touch the sheet 11. Each applicator 16.4 applies one part of a two-part adhesive to a respective side of the sheet 11 so as to apply strips 17*a* and 17*b*. Like Method 1, Method 5 employs an adhesive applicator formed integrally with the print head 13. A channel for the flow of one part of a two-part adhesive is provided in each print head 13.

The use of a two-part adhesive is beneficial in situations where there might be some delay in the printing/binding operation. The reason for this is that the two part adhesive requires mixing in order for setting to occur. Thus, if there were a computer software or hardware malfunction partway through a printing/binding operation, the use of a two-part adhesive could provide sufficient time within which to rectify the problem and complete the binding process.

Figure 4:
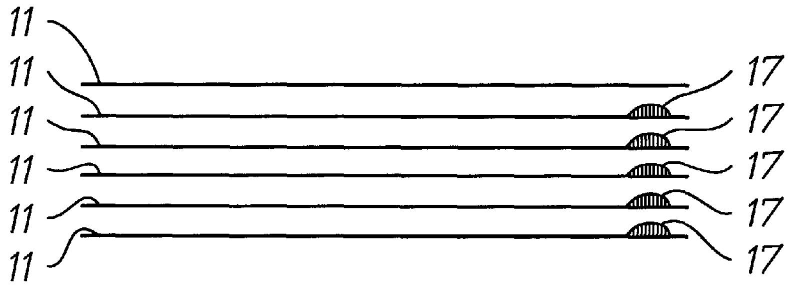
FIG. 4 is a schematic view of a number of sheets with all but the top sheet having a strip of adhesive applied to an upper surface adjacent to an edge to be bound.

FIG. 4 illustrates a stack of sheets 11 with all but the top sheet provided with an adhesive strip 17 at an upper surface adjacent one edge to be bound.

Figure 5:
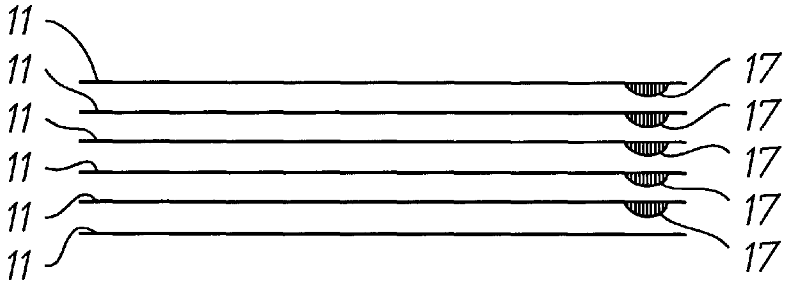
FIG. 5 is a schematic view of a stack of sheets with all but the bottom sheet having a strip of adhesive applied to a lower surface thereof adjacent to an edge to be bound.

An alternative is depicted in FIG. 5 wherein all but the bottom sheet has an adhesive strip 17 applied to its bottom surface adjacent an edge to be bound.

Figure 6:
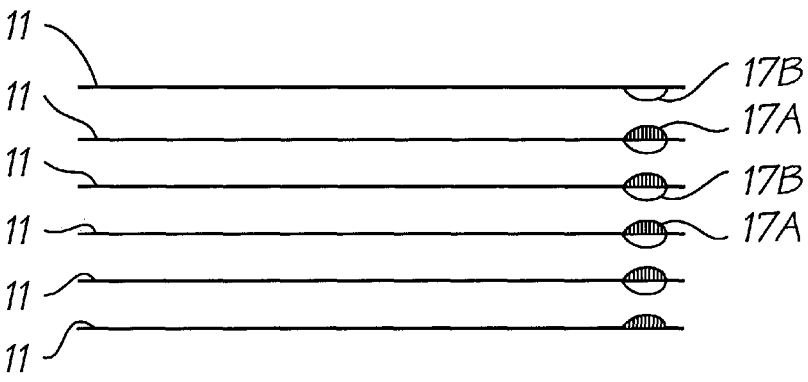
FIG. 6 is a schematic view of a stack of sheets with a first part of a two-part adhesive applied to the upper surface of all but the top sheet and a second part of a two-part adhesive applied to the bottom surface of all but the bottom sheet, in accordance with a method of the invention.

In FIG. 6, a stack of sheets is shown with a part 17A of a two-part adhesive applied to the upper surface of all but the top sheet 11 and a second part 17B of the two-part adhesive applied to the bottom surface of all but the bottom sheet 11.

When the stacks of sheets of FIGS. 4 and 5 are pressed together, adhesion of the sheets occurs as a result of mixing of the parts 17A and 17B.

When the sheets 11 of FIG. 6 are pressed together, the respective parts of the two-part adhesive in strips 17A and 17B combine so as to react and set.

In an embodiment where the print head 13 is an ink jet print head, and non-contact adhesive application Methods 1 and 5 are employed, the adhesive strip 17 is applied to sheet 11 before ink on the sheet 11 passing through the adhesive application station 10 has dried. Air passing through the air gap 14 accelerates the drying process. Adhesive is applied to the sheet 11 as it passes out of the print head 13. The air passing through the gap 14 facilitates a relatively high velocity of the sheet 11, even though the adhesive strip 17 is applied to the sheet 11.

When the strip 17 is applied alongside the leading edge 27 of the sheet 11, any alteration to the velocity of sheet 11 would adversely affect print quality. Hence, application of the adhesive strip 17 alongside the leading edge 27 is carried out using non-contact adhesive application methods or methods where the velocity of the adhesive applicator touching the sheet 11 is substantially the same as that of the sheet 11.

When the adhesive strip 17 is applied alongside the trailing edge 28 of the sheet 11, the same situation is also desirable. For example, if the speed of the adhesive applicator of Methods 2 to 4 was faster than that at which the sheet 11 was passing the print head 13, the sheet 11 could buckle.

A particular embodiment of the present invention incorporates the use of a two-part adhesive. Further, in this embodiment, the adhesive applicators are positioned within the print heads 13 themselves. Thus, the print head 13 defines at least one passage for the flow of adhesive through the print head 13. The advantage of this embodiment is that it would provide space and cost saving benefits.

The likelihood of adhesive "gumming" and blocking such channels is diminished where a two-part adhesive is used. This is achieved by having only one part of the two-part adhesive passing through any particular channel or channels of the print head 13.

Where respective parts of a two-part adhesive are applied to opposed sides of the sheets 11, those respective parts pass through dedicated channels in the respective print heads 13 on either side of the sheet 11. This greatly reduces the likelihood of adhesive blockages in the flow channels.

The adhesive or respective parts of a two-part adhesive can be provided in a chamber of a replaceable ink cartridge providing ink to the print head.

The print head 13 is positioned proximate the pinch rollers 12. The reason for this is that the rollers 12 provide a mechanical constraint upon the sheet 11 to enable accurate printing.

Figure 7:
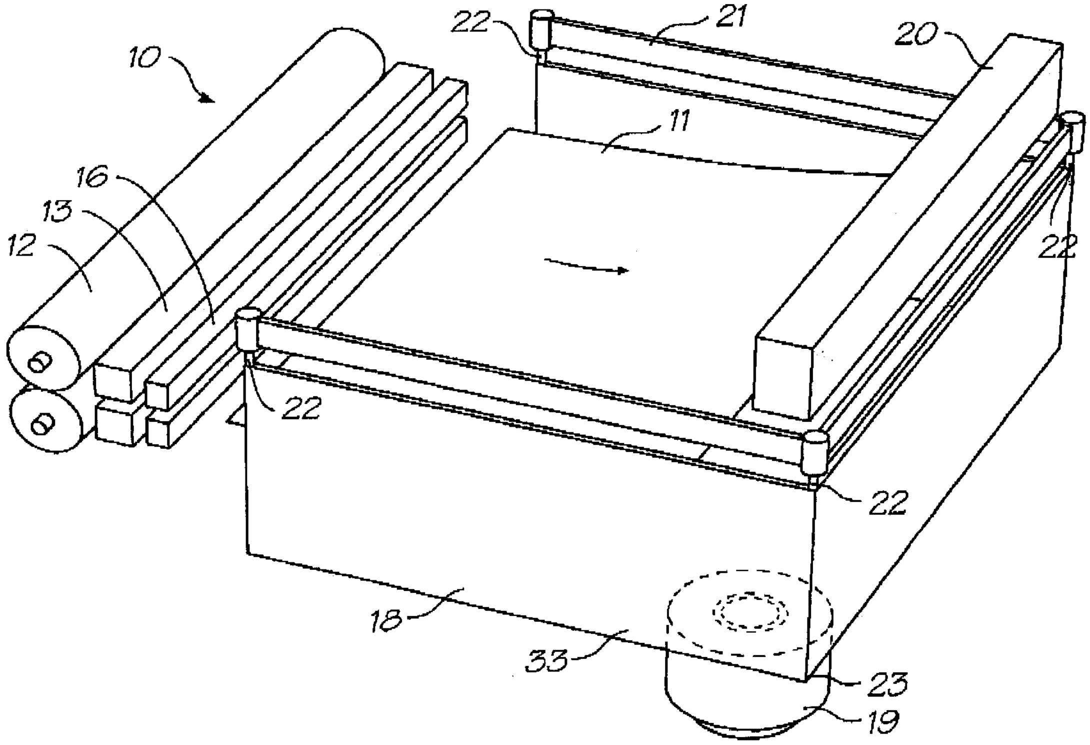
FIG. 7 is a schematic perspective view of a support tray situated immediately down-line of the adhesive applicator, and used in a method of the invention.

The pinch rollers 12, print heads 13 and adhesive applicator 16 are illustrated in FIG. 7 alongside a sheet support tray 18. Thus, the sheet support tray 18 receives sheets 11 once the adhesive strips 17 have been applied to the sheets 11. The tray 18 is suspended from a frame 21 with respective dampers 22 at each corner of the tray 18. The dampers 22 are elastomeric dampers or small hydraulic or pneumatic cylinders. The floor of the tray 11 has a lower-most corner 23 beneath which a vibrator 19 is positioned. The vibrator 19 is a subsonic vibrator (i.e. a vibrator having a frequency below 20 hz) or an out-of-balance electric motor.

A binding press 20 is situated above the tray 18 over aligned leading edges of the sheets 11, in use. Alternatively, the binding press 20 is positioned over the trailing edge 28 of the sheets 11.

Figure 8:
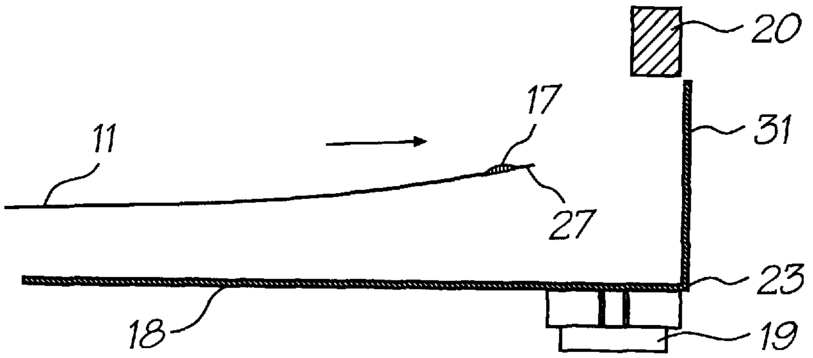
FIG. 8 is a schematic cross-sectional view of the support tray of FIG. 7 showing a first sheet having a strip of adhesive adjacent its edge at an upper surface in an initial path of travel towards the support tray.
Figure 9:
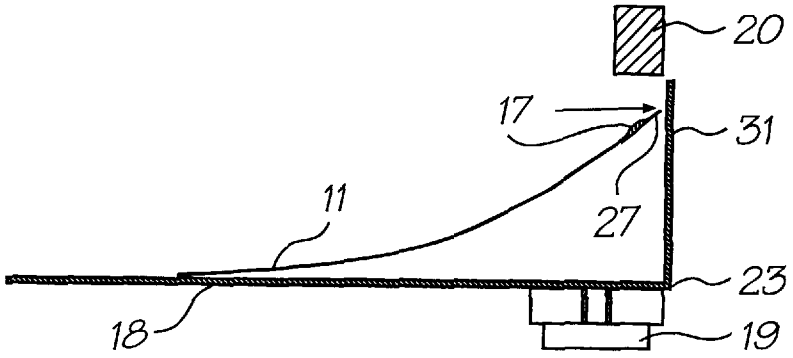
FIG. 9 is a schematic cross-sectional view of the support tray and sheet of FIG. 8, with the sheet in an intermediate path of travel towards the support tray.
Figure 10:
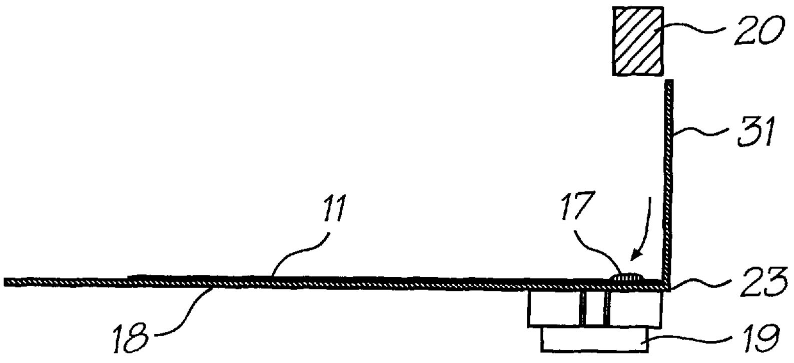
FIG. 10 is a schematic cross-sectional view of the support tray and sheet of FIGS. 8 and 9, with the sheet at rest on the tray.

In FIG. 8, a first sheet 11 is shown moving towards the tray 18. The sheet 11 has a strip of adhesive 17 on its upper surface adjacent the leading edge 27. It will be appreciated that the sheet 11 catches a pocket of air beneath it as it moves into position. This facilitates such movement by reducing friction substantially. The leading edge 28 then strikes a wall 31 of the support tray 18 as shown in FIG. 9. The vibrations of the tray 18 caused by the vibrator 19 results in the sheet 11 coming to rest with the leading edge 27 positioned adjacent the corner 23 of the tray 18 as shown in FIG. 10. Eventually, the leading edges 27 of the sheets 11 bear against the wall 31 of the tray 18 as shown in the drawings.

Figure 11:
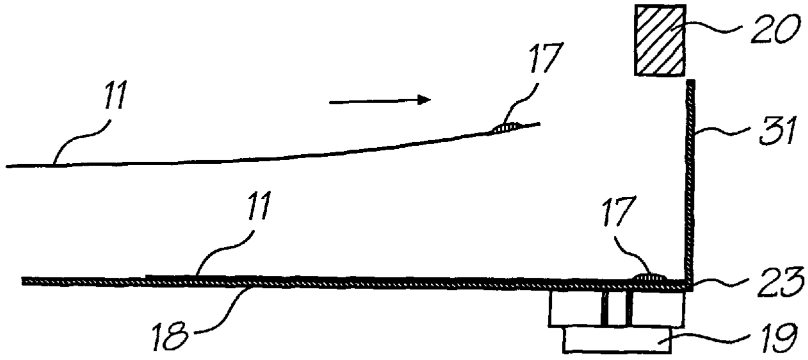
FIGS. 11, 12 and 13 are schematic cross-sectional views of the support tray showing a second sheet in a path of travel towards the first sheet.
Figure 12:
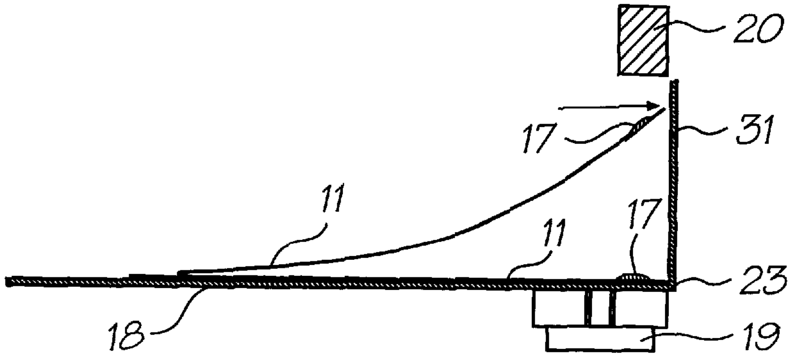
Figure 13:
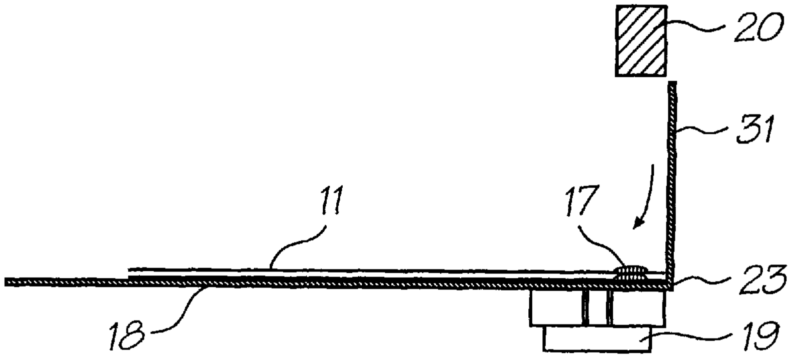

In FIG. 11, a second sheet 11 is shown moving towards the tray 18. The second sheet 11 comes to rest upon the first sheet 11 in a position aligned with the first sheet 11 as depicted in FIG. 13.

Figure 14:
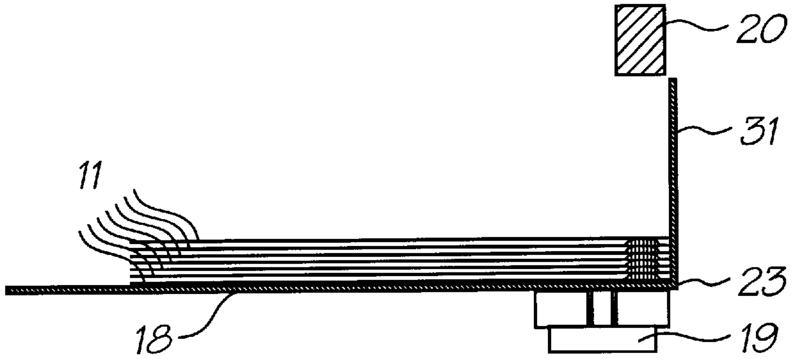
FIG. 14 is a schematic cross-sectional view of the support tray having a number of sheets resting on the support tray, with all but the top sheet having an upwardly facing strip of adhesive adjacent an edge thereof.

If the sheets 11 have the adhesive strip 17 applied to the upper surface, the final sheet 11 is provided without any adhesive and it comes to rest at the top of the stack as depicted in FIG. 14. If, instead, the majority of sheets 11 had the adhesive strip 17 applied to their bottom surface, the first sheet 11 (i.e. the sheet at the bottom of the stack) would have no adhesive applied to it. This would be suitable for multiple binding compressions.

Figure 15:
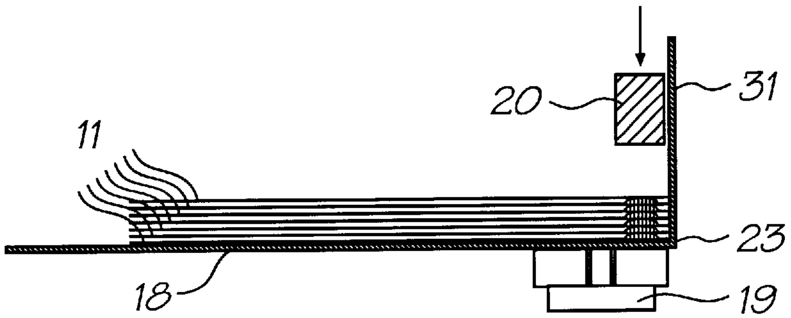
FIG. 15 is a schematic cross-sectional view of the support tray with a binding press in a path of travel towards an edge of the stacked sheets.
Figure 16:
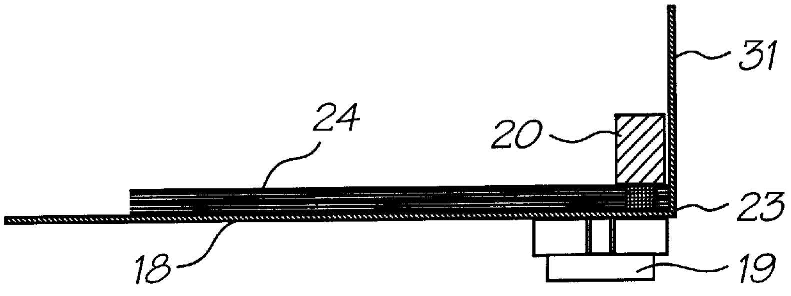
FIG. 16 is a schematic cross-sectional view of the support tray with sheets bound by application of the binding press.

As shown in FIG. 15, the binding press 20 is driven downwardly towards the stack of sheets 11 over the aligned adhesive strips 17. The stack is then compressed into a bound volume 24 as shown in FIG. 16.

It should be noted that no subsequent edge trimming of the bound volume is required provided standard-sized sheets 11 are used. The reason for this is that the vibrator 19 aligns the sheets 11 into the lower-most corner 23 of the tray 18 as described earlier.

Figure 17:
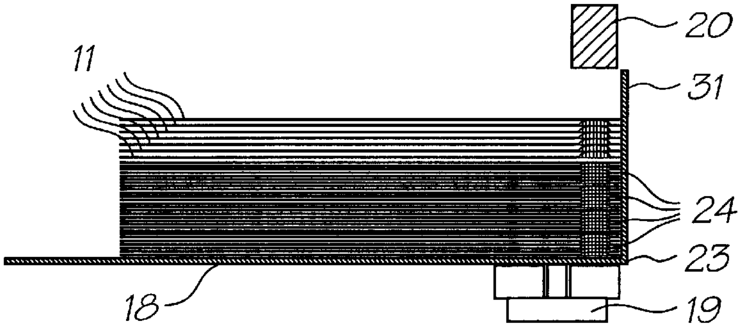
FIG. 17 is a cross-sectional view of the support tray having a number of individual documents resting on the support tray, prior to the binding press being applied to a top document.
Figure 18:
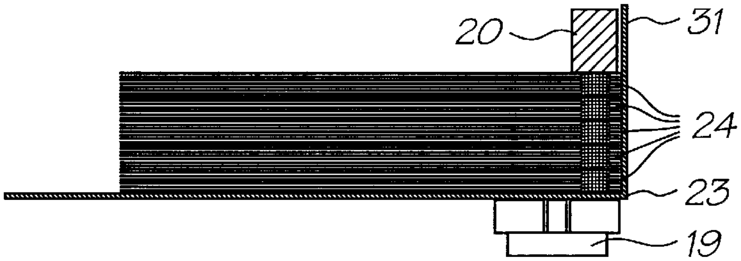
FIG. 18 is a schematic cross-sectional view of the support tray and documents of FIG. 17, with all documents having been pressed, one upon another.
Figure 19:
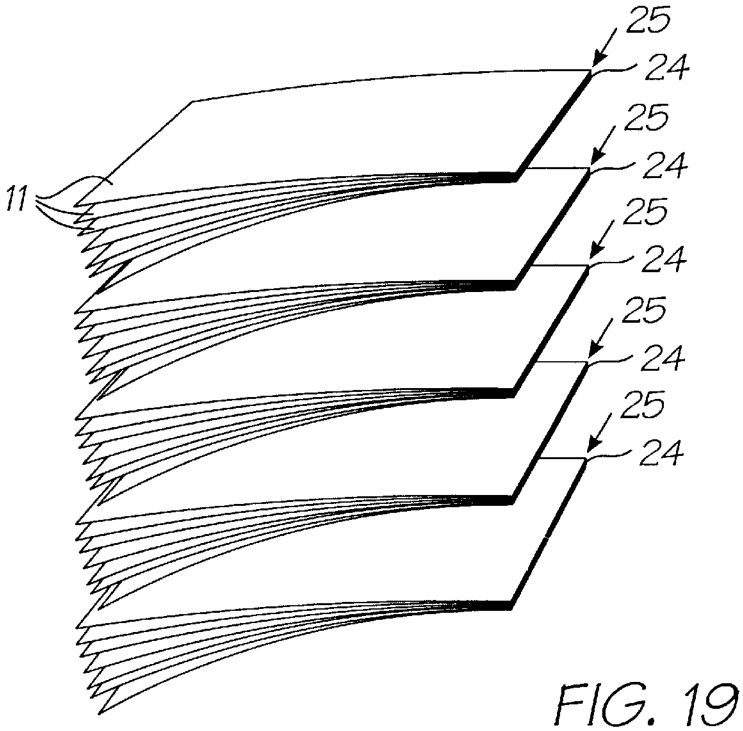
FIG. 19 is a schematic perspective illustration of a number of documents bound in accordance with the method of the invention.

In FIGS. 17 and 18, multiple volumes 24 are shown stacked one upon another with the upper-most volumes being progressively compressed by repeated applications of the press 20.

The binding press 20 is shown schematically in the Figures and could be pneumatically or hydraulically driven, or could be driven by other mechanical means such as rack and pinion, electrical solenoid or otherwise.

Figure 20:
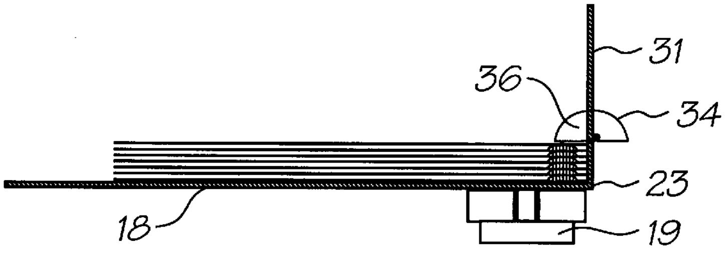
FIG. 20 is schematic view of a support tray incorporating a different binding press to that shown in the preceding drawings, to be used in accordance with the method of the invention.
Figure 21:
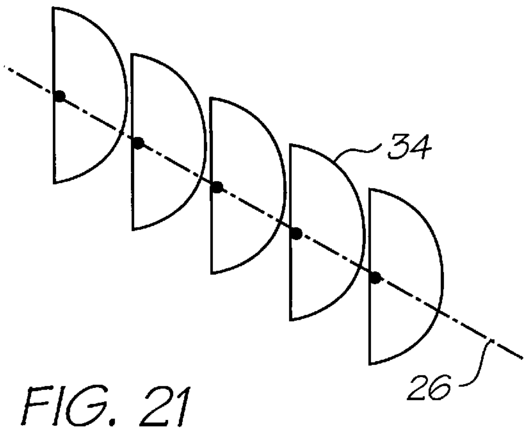
FIGS. 21 and 22 are schematic perspective views of a portion of the binding press of FIG. 20.
Figure 22:
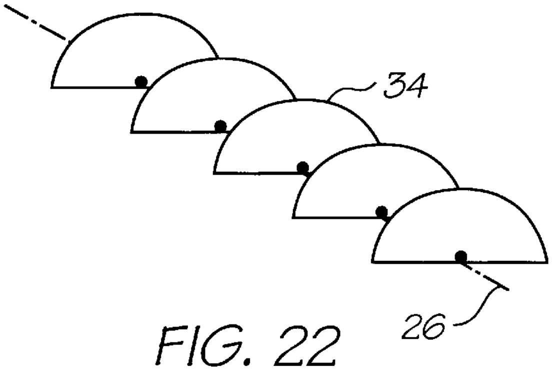
Figure 23:
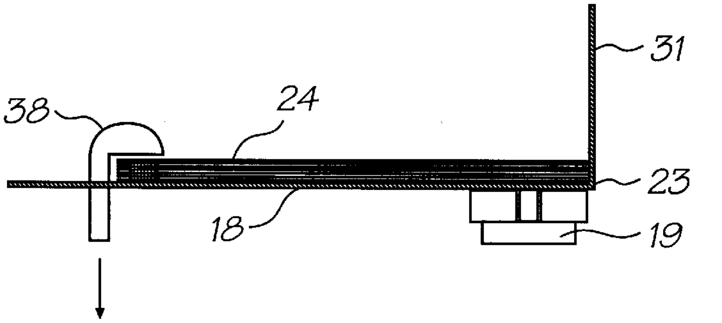
FIG. 23 is a schematic view of a support tray having an alternative press at a trailing edge of a stack of sheets to be bound.

One embodiment of the binding press 20 is depicted in FIGS. 20,21 and 22. In this embodiment, the binding press 20 incorporates a plurality of semicircular disks 34 each spaced apart, but fixedly mounted to a common, rotatably driven shaft 36 extending along an axis of rotation 26. Each disk 34 passes through a respective vertical slot 32 formed in the wall 31 of the tray 18. In an initial condition, the disks 34 are in the orientation shown in FIG. 21. Upon rotation of the shaft 36, the disks 34 pivot into a position shown in FIGS. 20 and 22 to press down upon the sheets 11.

The tray 18 is provided with a floor of adjustable height so that a top sheet 11 can be positioned proximate the binding press 20. This reduces noise levels by minimizing a stroke length of the binding press 20.

The floor of the tray 18 is driven to move downwardly as each sheet 11 is fed into the tray 18. This ensures that the top sheet 11 remains at a constant level. This also minimizes the extent of necessary movement of the binding press 20.

In the embodiment in which the adhesive strips 17 are applied alongside the trailing edge 28, the trailing edges 28 are pressed together with a pressing mechanism 38 provided in a position opposite the wall 31.

I claim:

1. A method of generating bound documents, the method comprising to steps of:

conveying sheets of a print medium through a printing station;

carrying out a printing process on the sheets in the printing station;

conveying the sheets through an adhesive application station;

applying one part of a two-part adhesive to one side of each sheet and another part of the two-part adhesive to an opposed side of each sheet proximate an edge of each sheet in the adhesive application station;

stacking a predetermined number of the sheets on a support tray assembly, to form a stack of sheets with respective strips of adhesive aligned with each other;

applying a damped vibratory movement to the support tray assembly to facilitate settling of the sheets; and applying pressure to the stack at a position aligned with the adhesive strips of the sheets so that the adhesive strips serve to bind together said predetermined number of sheets to define a document.

2. A method as claimed in claim 1, in which the step of applying adhesive to the sheets comprises the step of applying adhesive strips to the sides of each sheet to be bound, while the sheet moves through the adhesive application station.

3. A method as claimed in claim 2, which includes the step of applying the adhesive strips to each sheet by ejecting the adhesive from an adhesive applicator positioned at the adhesive application station with the adhesive applicator spaced from the sheet.

4. A method as claimed in claim 3, which includes the step of spraying the adhesive on to each sheet.

5. A method as claimed in claim 2, which includes the step of bringing a pair of opposed adhesive applicators into contact with the sheet while the sheet passes through the adhesive application station.

6. A method as claimed in claim 2, in which the step of applying the adhesive strip to each sheet includes the step of bringing a pair of opposed adhesive applicator rollers into contact with the sheet.

7. A method as claimed in claim 2, which includes the step of applying the adhesive strips to a trailing edge of each sheet.

8. A method as claimed in claim 2, which includes the step of applying the adhesive strips to a leading edge of each sheet.

9. A method as claimed in claim 2, in which the step of stacking the sheets includes feeding the sheets into a support tray of the support tray assembly, so that the sheets bear against a part of the support tray, with the adhesive strips of the sheets aligned with respect to each other.

* * * * *